TELEVISION RECEIVER BRIGHTNESS CONTROL
Filed June 22, 1964
Fig.1
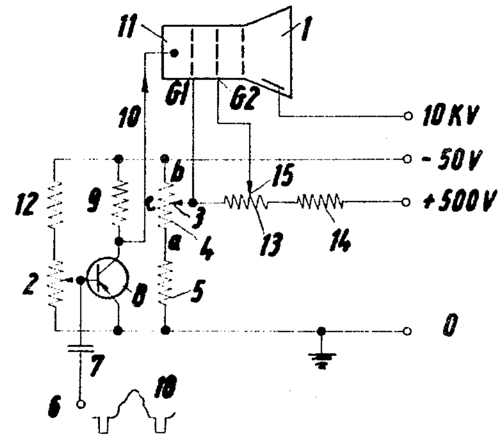
Fig.2
| | a | b | c |
|---|---|---|---|
| $V_{G1}$ | -22 | -58 | -35 |
| $V_{G2}$ | +23.5 | -3 | +10 |
| $V_{G2}-V_{G1}$ | +45.5 | +47 | +45 |
| $V_K$ | -20 | -20 | -20 |
VOLTS
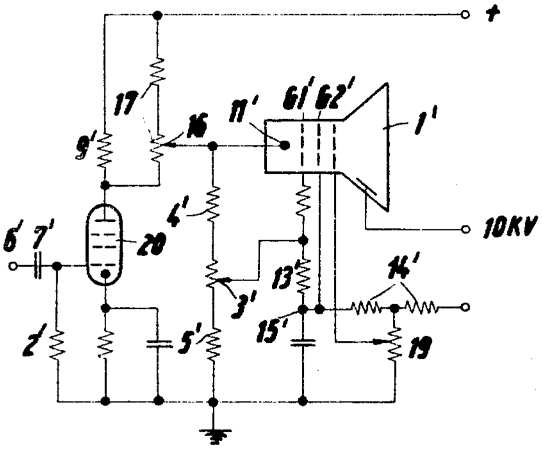
Fig.3
Jnventor:
Friedrich Kratochvil
By: Spencer & Kaye
ATTORNEYS United States Patent Office 3,398,236

Patented Aug. 20, 1968

3,398,236

TELEVISION RECEIVER BRIGHTNESS CONTROL

Friedrich Kratochvil, Hannover-Ricklingen, Germany, assignor to Telefunken Patentverwertungs-G.m.b.H., Ulm (Danube), Germany Filed June 22, 1964, Ser. No. 376,795
Claims priority, application Germany, June 29, 1963, T 24,214
11 Claims. (Cl. 178—7.5)

ABSTRACT OF THE DISCLOSURE

A circuit arrangement for adjusting the brightness of a TV picture tube having a cathode connected to an amplifier. A bias at a first control grid and a bias at a second control grid are uniformly variable in such manner that the direct current voltage between these two control grids remains approximately unchanged.

The present invention relates generally to the television art, and, more particularly, to a circuit for adjusting the brightness of a picture tube of "medium slope" in which the bias in the second grid is relatively low in order to increase the slope.

In a picture tube of medium slope the bias at grid 2 may amount, for example, only to 30–35 volts. The result of this is that the video control voltage which is applied to the cathode of the picture tube exerts, on the one hand with grid 1, but also with grid 2, a strong control effect upon the beam current which is approximately equal. The control effect with grid 2 is substantially stronger than in the case of tubes having a high bias at grid 2 in which the voltage between the cathode and grid 2 varies only slightly percentage-wise when controlling at the cathode. Because of the double-control effect which is obtained in the case of medium slope picture tubes, the effective slope of the tube is increased. However, the low bias at grid 2 creates problems which were not heretofore encountered. For example, when varying the direct current voltage at the cathode of the picture tube which occurs, for example, when regulating the contrast by means of a sliding contact at the operating resistor of the video output tube, the direct current voltage between the cathode and grid 2 at the picture tube is varied greatly. With an increase in the cathode voltage, the positive bias of grid 2 with respect to the cathode may vanish completely or may even become negative.

It is to be noted that "slope" as used herein refers to the slope of the transconductance.

With there defects of the prior art in mind, it is a main object of the present invention to provide a circuit for medium slope picture tube which avoids the above-mentioned disadvantages.

Another object of the invention is to provide a device of the character described which is relatively simple and inexpensive in construction.

These objects and others ancillary thereto are accomplished in accordance with preferred embodiments of the invention wherein a circuit arrangement is provided for adjusting the brightness of a medium slope television picture tube which is provided with two control grids and in which the cathode is galvanically connected with the output electrode of an amplifier element for the control voltage, with this amplifier element being connected before the tube. In order to adjust the brightness, the bias at the first control grid and the bias at the second control grid of the picture tube are uniformly variable in such manner that the direct current voltage between these two control grids remains approximately unchanged.

The simultaneous varying of the bias of the two grids of the picture tube can be accomplished by using two mechanically coupled potentiometers. In a preferred embodiment of the invention in which only a simple potentiometer is needed, the bias for the first control grid is provided from the slide contact of a first voltage divider and the bias for the second control grid is provided from a fixedly arranged tap of a second voltage divider which is high ohmic with respect to the first-mentioned voltage divider. This second voltage divider is connected between the slide contact of the first voltage divider and a high operating voltage.

Additional objects and advantages of the present invenwill become apparent upon consideration of the following description when taken in conjunction with the accompanying drawings in which:

FIGURE 1 is a circuit diagram of a first embodiment of the present invention.

FIGURE 2 is a voltage chart.

FIGURE 3 is a circuit diagram of a slightly modified embodiment of the present invention.

With more particular reference to the drawings, FIGURE 1 illustrates a picture tube 1 having a first control grid G1 connected to the sliding contact 3 of a voltage divider 4, 5 which is connected between a negative operating voltage of —50 volts and ground. The video voltage 18 is fed to the base of an amplifying transistor 8 from a terminal 6 and through a capacitor 7. The video voltage arrives at the cathode 11 of the picture tube 1 via a line 10 and a resistor 9 which is disposed in the collector circuit of the amplifying transistor. A voltage divider 2, 12 is disposed between the negative operating voltage of —50 volts and ground and serves for adjusting the base bias for transistor 8. A further voltage divider 13, 14 is connected between the slide contact 3 and a high positive operating voltage of 500 volts. The bias for the second control grid G2 of the picture tube 1 is derived from a stationary or fixedly set tap 15 of this voltage divider 13, 14.

The voltage divider 13, 14 is high ohmic with respect to the voltage divider 4, 5. Furthermore, the resistance between tap 15 and slide contact 3 is small with respect to the total resistance of the voltage divider 13, 14 because of the high operating voltage of 500 volts. The brightness of the picture tube 1 is regulated by means of the slide contact 3. The base voltage divider 12, 2 of transistor 8 can also be used as voltage divider 4, 5.

In the operation of the circuit, when the slide contact 3 is actuated in order to change the brightness of the picture tube 1, the voltage $V_{G1}$ at grid G1 can be varied within the desired operating range of tube 1 as shown in FIGURE 2. Thus, when contact 3 is at points *a* or *b* of resistor 4, the voltages indicated in FIGURE 2 at *a* and *b*, respectively, appear; at some intermediate point *c*, the voltages listed in column *c* appear. Since the voltage divider 4, 5 is low ohmic with respect to voltage divider 13, 14 the current through voltage divider 13, 14 is hardly changed percentage-wise. The change that does take place is only by the amount corresponding to the voltage variation at slide contact 3. However, this voltage variation is small compared to the operating voltage of 500 volts connected to the right end of voltage divider 13, 14.

Therefore, only a small portion of the voltage variation is effective at slide contact 3 because the resistance between tap 15 and slide contact 3 is small compared to the total resistance of the voltage divider 13, 14 and therefore the voltage between the control grids G1 and G2 remains practically unchanged when the slide contact 3 is moved. That is, as the current through the resistor 13 changes hardly at all percentage-wise, the voltage across the resistor 13 or the voltage between taps 15 and 3, respectively, also hardly changes at all.

In FIGURE 2, the voltages are shown for three positions of slide contact 3. The table indicates that the voltage $V_{G2}-V_{G1}$ between the two grids C1 and G2 varies by only two volts, or about 4%. The voltage at the cathode 11, which is here assumed to be constant, is indicated as $V_k$ in the table.

With more particular reference now to the embodiment of FIGURE 3, elements which are similar to those of FIGURE 1 are indicated with similar reference numerals but have primes added, and in this embodiment it may be seen that the transistor is replaced by a tube 20. Contrast regulation is carried out by means of a slide contact 16 of a voltage divider 17 connected in parallel with the resistor 9'. By means of slide contact 16, video voltages of different magnitudes are fed to cathode 11' of picture tube 1'.

The advantage of the present invention can clearly be seen in connection with this circuit. Without the circuit, that is, with a constant voltage at grid G2' the direct current voltage at cathode 11' can increase to such an extent when the contrast is being regulated at the slide contact 16 that the grid G2', because of its low bias, is no longer biased with respect to the cathode. In any event, the voltage between the cathode and grid G2' would greatly vary in an undesirable manner and would influence the slope of the tube 1'. However, because in FIGURE 2, the upper end of voltage divider 4', 5' is connected to the cathode 11' and follows the voltage variations of the cathode, and in FIGURE 1, the grids G1, G2 are connected with the cathode via the circuit, the voltages at the first control grid G1 or G1' and the second control grid G2 or G2' vary to the same extent as the voltage at cathode 11 or 11'. The voltage relationship between cathode 11 or 11', grid G1 or G1' and G2 or G2' thus is approximately retained in the desired manner. Resistor 19 provides for adjustment of the focussing voltage of tube 1.

In a practical embodiment of the present invention which has been constructed, the various circuit elements were provided as follows:

Tube 1: AW28–10" (Telefunken type) (11AP4, General Electric U.S. similar type).

Transistor 8: OD603 (Telefunken type) (2N249, U.S. equivalent type).

Resistor 2: 100 ohms.
Resistor 4: 50K ohms.
Resistor 5: 40K ohms.
Resistor 9: 4.7K ohms.
Resistor 12: 6.5K ohms.
Resistor 13: 100K ohms.
Resistor 14: 1 megohm.

In one practical example of the circuits of FIGS. 1 and 3 the resistance between tap 15 and slide contact 3 is in the order of 60K ohms whereas the total resistance of the voltage divider 13, 14 is in the order of 1.1 megohms. When, for example, the second source of operating voltage provides a voltage of approximately +500 volts then the voltage variation at the first grid which occurs in adjusting the brightness is only about 30 volts, i.e. very small with respect to the second operating voltage.

The base voltage divider 12, 2 in FIG. 1 can be used as voltage divider 4, 5 by omitting resistors 4, 5 and providing the slide contact 3 at the resistor 12, because resistors 12, 2 and resistors 4, 5 are connected parallel.

It will be understood that the above description of the present invention is susceptible to various modifications, changes and adaptations, and the same are intended to be comprehended within the meaning and range of equivalents of the appended claims.

What is claimed is:

1. In a circuit device for adjusting the brightness of a medium slope television tube having a cathode and two control grids with the cathode connected with the output electrode of an amplifier element for the control voltage and which amplifier element is connected before the tube, the improvement comprising means for adjusting the brightness by uniformly varying the bias of the first control grid and the bias of the second control grid so that the direct current voltage between the two control grids remains approximately unchanged.

2. The improvement as defined in claim 1 wherein the direct current voltage at the cathode of the picture tube is connected to be used as the bias source for the first control grid.

3. A circuit device for adjusting the brightness of a medium slope television picture tube of the type having a cathode and two control grids, comprising, in combination:

an amplifier element for the control voltage connected before the tube and having an output electrode which is connected with the cathode of the picture tube;
means for biasing the first control grid;
means for biasing the second control grid; and
means for adjusting the brightness of the picture tube by uniformly varying the bias of the first control grid and the bias of the second control grid so that the direct current voltage between these two control grids remains approximately unchanged.

4. A device as defined in claim 3 wherein said means for biassing said first control grid includes a first source of operating voltage and a first voltage divider connected between said first source of operating voltage and ground, said adjusting means includes a slide contact for said first voltage divider, and said means for biassing the second control grid includes a second source of operating voltage, a second voltage divider and a stationary tap, said second voltage divider being connected between the slide contact of the first voltage divider and said second source of operating voltage.

5. A device as defined in claim 4 wherein said second source of operating voltage is large with respect to said first source of operating voltage.

6. A device as defined in claim 4 wherein the resistance between the tap of the second voltage divider and the slide contact of the first voltage divider is small as compared to the resistance of the entire second voltage divider.

7. A device as defined in claim 6 wherein the second source of operating voltage is so high that the voltage variation at the first grid of the tube which occurs in adjusting the brightness is small as compared to this operating voltage.

8. A device as defined in claim 4 wherein a larger bias is derived from the second voltage divider and the second source of operating voltage is larger than the first source of operating voltage.

9. A device as defined in claim 4 wherein said amplifier element is a transistor having a base, and the first voltage divider is connected to be the base voltage divider of the transistor.

10. A circuit device for adjusting the brightness of a medium slope television picture tube of the type having a cathode and two control grids, comprising, in combination:

means for biassing the first control grid;
means for biassing the second control grid; and
means for adjusting the brightness of the picture tube by uniformly varying the bias of the first control grid and the bias of the second control grid so that the direct current voltage between these two control grids remains approximately unchanged.

11. A circuit device, comprising, in combination:

a cathode ray tube having a cathode and first and second grids;
an amplifier having an output connected to said cathode;
a first voltage divider for said first grid connected between a source of negative voltage and ground and including a slide contact connected with said first grid; and a second voltage divider which is connected between said slide contact and a source of positive voltage which is large with respect to the source of negative voltage and having a tap at such a point that the resistance between the tap and the slide contact is small compared to the resistance of the entire second voltage divider, said tap being connected to said second grid.

References Cited

UNITED STATES PATENTS

| | | | |
|---|---|---|---|
| 3,043,909 | 7/1962 | Loughlin | 178—7.5 |
| 3,255,310 | 6/1966 | Loughlin et al. | 178—7.5 |
| 3,294,904 | 12/1966 | Percival | 178—7.5 |
| 3,334,180 | 8/1967 | Loughlin | 178—7.5 |

ROBERT L. GRIFFIN, *Primary Examiner*.

R. L. RICHARDSON, *Assistant Examiner*.